United States Patent
Tian et al.

(10) Patent No.: US 12,552,920 B2
(45) Date of Patent: Feb. 17, 2026

(54) ENVIRONMENTALLY FRIENDLY IMPREGNATION SYSTEMS FOR FIBER SURFACE TREATMENT AND PREPARATION METHODS THEREOF AND AN IMPREGNATION TREATMENT METHOD

(71) Applicant: Beijing University of Chemical Technology, Beijing (CN)

(72) Inventors: Ming Tian, Beijing (CN); Desong Du, Beijing (CN); Nanying Ning, Beijing (CN); Wencai Wang, Beijing (CN); Liqun Zhang, Beijing (CN); Bing Yu, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 77 days.

(21) Appl. No.: 18/688,713

(22) PCT Filed: Sep. 1, 2022

(86) PCT No.: PCT/CN2022/116397
§ 371 (c)(1),
(2) Date: Mar. 1, 2024

(87) PCT Pub. No.: WO2023/030423
PCT Pub. Date: Mar. 9, 2023

(65) Prior Publication Data
US 2024/0368388 A1    Nov. 7, 2024

(30) Foreign Application Priority Data
Sep. 2, 2021   (CN) .......................... 202111027228.6

(51) Int. Cl.
| | | |
|---|---|---|
| C08L 19/02 | (2006.01) |
| C08G 18/62 | (2006.01) |
| C08G 18/64 | (2006.01) |
| C08G 18/80 | (2006.01) |
| C08L 9/08 | (2006.01) |
| D06M 13/395 | (2006.01) |
| D06M 13/53 | (2006.01) |
| D06M 15/263 | (2006.01) |
| D06M 15/423 | (2006.01) |
| D06M 15/55 | (2006.01) |
| D06M 15/693 | (2006.01) |
| D06M 15/71 | (2006.01) |
| D06M 101/32 | (2006.01) |
| D06M 101/34 | (2006.01) |
| D06M 101/36 | (2006.01) |

(52) U.S. Cl.
CPC .......... *C08L 19/02* (2013.01); *C08G 18/6229* (2013.01); *C08G 18/6415* (2013.01); *C08G 18/8074* (2013.01); *C08G 18/8077* (2013.01); *C08L 9/08* (2013.01); *D06M 13/395* (2013.01); *D06M 13/53* (2013.01); *D06M 15/263* (2013.01); *D06M 15/423* (2013.01); *D06M 15/55* (2013.01); *D06M 15/693* (2013.01); *D06M 15/71* (2013.01); *D06M 2101/32* (2013.01); *D06M 2101/34* (2013.01); *D06M 2101/36* (2013.01); *D06M 2200/00* (2013.01)

(58) Field of Classification Search
None
See application file for complete search history.

(56) References Cited

U.S. PATENT DOCUMENTS

2017/0073446 A1* 3/2017 Corten .................. C08F 212/08

FOREIGN PATENT DOCUMENTS

| CN | 105051284 A | 11/2015 |
|---|---|---|
| CN | 106084362 A | 11/2016 |
| CN | 109267350 A | 1/2019 |
| CN | 110284326 A | 9/2019 |
| CN | 112176729 A | 1/2021 |
| JP | 2010024601 A | 2/2010 |
| WO | WO-2018182229 A1 * | 10/2018 ............. C09J 111/02 |

* cited by examiner

*Primary Examiner* — Robert S Jones, Jr.
*Assistant Examiner* — Lily K Sloan
(74) *Attorney, Agent, or Firm* — Weisun Rao; Lili Huang; Venture Partner, LLC

(57) ABSTRACT

The invention discloses an environmentally friendly impregnation system for fiber surface treatment and a preparation method thereof, and an impregnation treatment method. The environmentally friendly impregnation system for fiber surface treatment of the invention includes hydroxyacrylic resin, amino resin, epoxy resin, blocked isocyanate, accelerator, rubber latex, and deionized water. Depending on the type of fiber and its application, the invention allows for the selection of one-step impregnation treatment or two-step impregnation treatment. The invention can effectively replace the use of toxic raw materials and intermediates in traditional RFL impregnation system, reducing harm to human health and the environment while achieving the adhesion level of RFL treatment.

10 Claims, No Drawings

ENVIRONMENTALLY FRIENDLY IMPREGNATION SYSTEMS FOR FIBER SURFACE TREATMENT AND PREPARATION METHODS THEREOF AND AN IMPREGNATION TREATMENT METHOD

CROSS-REFERENCE TO RELATED APPLICATIONS

This application is the U.S. national phase under 35 U.S.C. § 371 of International Patent Application No. PCT/CN2022/116397, filed on Sep. 1, 2022, which claims priority to Chinese Application No. 202111027228.6, filed on Sep. 2, 2021, the contents of both of which are incorporated herein by reference in their entirety.

TECHNICAL FIELD OF THE INVENTION

The present invention belongs to the field of fiber impregnation, and specifically relates to an environmentally friendly impregnation system for fiber surface treatment and a preparation method thereof, and impregnation treatment method, which is particularly suitable for rubber skeleton materials.

BACKGROUND OF THE INVENTION

Fiber cord and cord fabric are widely used as reinforcing materials for rubber in products such as tires, hoses and conveyor belts. The interfacial adhesion properties between the fibers and the rubber matrix are critical to the reinforcing effect of the fibers. Since 1935, the resorcinol-formaldehyde-latex (RFL) impregnation method has become the most effective method to improve the adhesion properties between fibers and rubber. However, both resorcinol and formaldehyde in RFL system are toxic substances, which have serious toxic effects on human body and environment. Resorcinol has a property of causing skin irritation or abrasions upon contact and is toxic to the liver and cardiovascular system. Formaldehyde which can easily lead to leukaemia is more hazardous to human health and safety than resorcinol, and as early as 2004, the International Agency for Research on Cancer (IARC) of the World Health Organization classified it as a carcinogen. Therefore, there is an urgent need to develop new environmentally friendly fiber impregnation treatment systems to replace the conventional RFL systems.

US 20150314644 A1 (WO2014091429 A1), US 2012041113 A1 (WO 2010125992 A1), U.S. Pat. No. 5,565,507 A (WO 9600749 A1), and CN 105839413 A disclose environmentally friendly impregnating solution based on epoxy resin. Among them, US 2015314644A1 discloses an adhesive formulation comprising a rubber latex, an epoxy compound, and a polyamine with a molecular weight greater than 190 daltons, and these compositions produce adhesion between the fiber backbone material and the adhesive material that is close to that of a conventional RFL system. US 2012041113 A1 discloses a rubber impregnation solution comprising an epoxy resin, an amino curing agent, a capped isocyanate, a rubber latex for enhancing the adhesive properties between a fiber woven fabric and rubber. U.S. Pat. No. 5,565,507 A discloses an impregnation solution comprising an epoxy resin of trifunctionality or higher, and a latex containing carboxyl, amino, or pyridine groups. CN 105839413 A discloses a impregnation system comprising an epoxy resin, an amine curing agent, and a latex, which has an adhesive effect superior to that of the RFL treatment system.

CN112176729A (WO2021000918A1), US2005147817A1, US2005255773A1 disclose an environmentally friendly rubber impregnation solution with maleic anhydride-based polymers. Among them, CN112176729A discloses an impregnation system comprising a maleic anhydride-based polymer, an epoxy resin, a blocked isocyanate, a curing agent, a rubber latex, and optional component fillers, and the fibers treated with this impregnation system have excellent adhesive properties, and can achieve the adhesive effect of an RFL. US2005147817A1 discloses an environmentally friendly impregnation system comprising a semi-esterified maleic anhydride polybutadiene, carbon black, latex and the like, which can effectively improve the adhesion between fibers and EPDM rubber. US2005255773A1 discloses a leaching solution comprising maleic anhydride polyolefin, maleimide resin, metal salt of vinyl unsaturated carboxylic acid, and latex, which is used to improve the adhesion performance between fibers and rubber.

US2015315410A1, U.S. Pat. No. 4,472,463A, and CN109097993A disclose environmentally friendly adhesive impregnation solutions based on acrylic resin. Among them, US2015315410A1 discloses an impregnation solution comprising an acrylic resin with carboxyl groups, an epoxy resin, a blocked isocyanate, and a latex, which has an adhesion effect slightly better than that of RFL. The impregnation solution of U.S. Pat. No. 4,472,463A contains acrylic monomers with a small amount of styrene copolymers and a latex, which has an adhesion effect slightly better than that of the RFL impregnation system. CN109097993A discloses an impregnation system comprising a self-crosslinking acrylic resin, a capped isocyanate, and a rubber latex, which achieves good adhesion between the impregnated fabric and the rubber, and achieves an impregnation effect that is as good as or better than that of conventional RFL.

CN106120350A discloses an impregnation treatment system comprising tannic acid, polyamine, and rubber latex, and the adhesive effect of polyester cord fabric treated by the method is comparable to that of RFL, and the adhesive effect at high temperatures is superior to that of RFL. CN110284326A discloses an impregnation treatment system comprising a special amino resin (mainly a benzoxazino resin), a closed-end isocyanate, an auxiliary agent, and rubber latex, which treats nylon fibers in such a way that the adhesive effect can reach the level attained with RFL treatment.

Although the prior arts have made some improvements of the adhesive properties between fibers and rubber, the prior arts still have some problems, which mainly include that the bonding strength provided by the impregnation system does not reach the RFL level; some raw materials used in the formulation have stringent requirements, resulting in higher procurement costs; and there are complexities involved in the production process. Therefore, there is also a need for a new type of environmentally friendly impregnation system for fiber surface treatment that can substantially improve the adhesive properties between fibers and rubber, can replace the RFL impregnation system currently used in industry, and can avoid the use of toxic substances such as resorcinol and formaldehyde.

DETAILED DESCRIPTION OF THE INVENTION

In the first aspect, the present invention provides an environmentally friendly impregnation system for the fiber surface treatment comprising the following components in parts by weight:

| | |
|---|---|
| deionized water | 100 parts |
| hydroxyacrylic resin | 1-30 parts |
| amino resin | 0.1-10 parts |
| blocked isocyanates | 1-10 parts |
| accelerator | 0.1-5 parts |
| rubber latex | 50-180 parts. |

Preferably, the present invention provides an environmentally friendly impregnation system for fiber surface treatment comprising the following components in parts by weight:

| | |
|---|---|
| deionized water | 100 parts |
| hydroxyacrylic resin | 1-15 parts |
| amino resin | 0.1-8 parts |
| epoxy resin | 1-10 parts |
| blocked isocyanates | 1-10 parts |
| accelerator | 0.1-4 parts |
| rubber latex | 50-150 parts. |

Even further preferably, the present invention provides an environmentally friendly impregnation system for fiber surface treatment comprising the following components in parts by weight:

| | |
|---|---|
| deionized water | 100 parts |
| hydroxyacrylic resin | 3-12 parts |
| amino resin | 0.5-4 parts |
| epoxy resin | 0.5-6 parts |
| blocked isocyanates | 3-8 parts |
| accelerator | 0.5-4 parts |
| rubber latex | 50-150 parts. |

According to some specific embodiments of the present invention, said environmentally friendly impregnation system for fiber surface treatment is a one-step impregnation solution, wherein the environmentally friendly impregnation system comprises the following components in parts by weight: 100 parts of deionized water; 1-30 parts of hydroxyacrylic resin; 0.1-10 parts of amino resin; 1-10 parts of blocked isocyanate; 0.1-5 parts of accelerator; 50-180 parts of rubber latex. Preferably, the one-step impregnation solution comprises an epoxy resin, wherein the environmentally friendly impregnation system comprises the following components in parts by weight: 100 parts of deionized water; 1-15 parts of hydroxyacrylic resin; 0.1-8 parts of amino resin; 1-10 parts of epoxy resin; 1-10 parts of blocked isocyanate; 0.1-4 parts of accelerator; 50-150 parts of rubber latex.

According to some specific embodiments of the present invention, said environmentally friendly impregnation system for fiber surface treatment comprises a one-bath impregnation solution and a two-bath impregnation solution: 1) said one-bath impregnation solution comprises the following components in parts by weight: 0.5-2.5 parts of epoxy resin, 3-10 parts of blocked isocyanate and 90-110 parts of deionized water; 2) said two-bath impregnation solution comprises the following components in parts by weight: 5-15 parts of hydroxyacrylic resin, 0.5-3 parts of amino resin, 1-5 parts of accelerator, 80-200 parts of rubber latex and 90-110 parts of deionized water; Preferably, 1) said one-bath impregnation solution comprises the following components in parts by weight: 1-2 parts of epoxy resin, 5-8 parts of blocked isocyanate and 95-105 parts of deionized water by weight of the content of each component; 2) said two-bath impregnation solution comprises the following components in parts by weight: 7-10 parts of hydroxyacrylic resin, 1-2.5 parts of amino resin, 1.5-3 parts of accelerator, 100-180 parts of rubber latex and 95-105 parts of deionized water.

According to some embodiments of the present invention, said hydroxyacrylic resin has a hydroxyl content of 2.0-5.0 wt %.

According to some embodiments of the present invention, said hydroxyacrylic resin has a molecular weight (number average) of 8000-15000.

According to some embodiments of the present invention, said amino resin are all soluble in water or in latex emulsions, preferably at least one selected from the group consisting of urea-formaldehyde resin, melamine-formaldehyde resin, polyaminamide epichlorohydrin resin, etherified urea-formaldehyde resin, etherified glycoluronium resin, fully methylated melamine resin, polymeric partially methylated melamine resin, or polymeric high-imino methylated melamine resin. Preferably the molecular weight (number average) of said amino resin may be 100-800.

According to some embodiments of the present invention, said epoxy resins are all soluble in water or in latex emulsions, preferably are at least one selected from the group consisting of bisphenol A-typed epoxy resin, epoxidised linear phenolic resin, ethylene glycol diglycidyl ethers, polyethylene glycol diglycidyl ethers, 1,2-propylene glycol diglycidyl ethers, poly(propylene glycol) diglycidyl ethers, 1,4-butylene glycol diglycidyl ethers, propylene tritritol diglycidyl ethers, tris-hydroxymethyl propane glycidyl ether, tetraphenol ethane tetra-glycidyl ether, sorbitol glycidyl ether, resorcinol diglycidyl ether or methylene-bis(1, 3-benzenediol)-tetra glycidyl ether.

According to some embodiments of the present invention, the blocked isocyanate consists of an isocyanate and a blocking agent, said isocyanate is at least one selected from the group consisting of trimethyl-1,6-hexamethylene diisocyanate, tetramethylene diisocyanate, tetramethylene diisocyanate, 2,4-toluene diisocyanate, 2,6-toluene diisocyanate, 1,3-phenylene diisocyanate, 1,4-phenylene diisocyanate, isophorone diisocyanate and diphenylmethane diisocyanate; said blocking agent is at least one selected from the group consisting of ε-caprolactam, butanone oxime and phenol.

According to some embodiments of the present invention, said accelerator is at least one selected from the group consisting of amine-capped dinonyl naphthalene disulfonic acid, amine-capped dinonylnaphthalene sulfonic acid, amine-capped dodecylbenzenesulfonic acid or amine-capped p-toluenesulfonic acid.

According to some embodiments of the present invention, said rubber latex has a solids content of 20-60 wt %, said rubber latex is at least one selected from the group consisting of butyl pyridine latex, examples of which include, but are not limited to, carboxybutyl pyridine latex; butylbenzene latex, examples of which include, but are not limited to, carboxybutylbenzene latex; butyl pyridine latex, chloroprene latex, nitrile latex, examples of which include, but are not limited to, carboxybutadiene nitrile latex or natural latex.

In the second aspect, the present invention also provides a method of preparing an environmentally friendly impregnation system for fiber surface treatment, wherein the method comprises the following steps:

one-step impregnation solution system: hydroxyacrylic resin, amino resin, optional epoxy resin and accelerator are added to deionized water in turn and stirred, then blocked isocyanate is added and stirred, and finally rubber latex is added and continued to be stirred to obtain the one-step impregnation solution;

wherein, the amount of each component in parts by weight is: 100 parts of deionized water; 1-30 parts of hydroxyacrylic resin; 0.1-10 parts of amino resin; 1-10 parts of blocked isocyanate; 0.1-5 parts of accelerator; 50-180 parts of rubber latex; or two-step impregnating solution system: 1) add the epoxy resin to the deionized water and stir, and then add the blocked isocyanate and stir to get a uniform reaction solution, thereby obtaining one-bath impregnating solution; 2) add the hydroxyacrylic resin, amino resin and accelerator to the deionized water and stir in turn to get a uniform dispersion, and then add the rubber latex at the end, and continue stirring, thereby obtaining two-bath impregnating solution;

wherein the amount of each component in parts by weight of the one-bath impregnation solution is: 1-2 parts of epoxy resin, 5-8 parts of blocked isocyanate and 95-105 parts of deionized water;

the amount of each component in parts by weight of the two-bath impregnation solution is: 7-10 parts of hydroxyacrylic resin, 1-2.5 parts of amino resin, 1.5-3 parts of accelerator, 100-180 parts of rubber latex and 95-105 parts of deionized water.

In the third aspect, the present invention also provides an impregnation treatment method for fiber surface treatment, characterized in that the method comprises the following steps:

(A) the fiber is impregnated in a one-step impregnation solution;
(B) drying and curing the impregnated fibers obtained in step (A).
wherein the one-step impregnation solution comprises the following components in parts by weight: 100 parts of deionized water; 1-30 parts of hydroxyacrylic resin; 0.1-10 parts of amino resin; 1-10 parts of blocked isocyanate; 0.1-5 parts of accelerator and 50-180 parts of rubber latex.

According to some embodiments of the present invention, in step (A), said impregnation is carried out at a temperature of 15-40° C. for 1-5 min.

According to some embodiments of the present invention, in step (B), said drying is carried out at a temperature of 110-160° C. for 1-10 min.

According to some embodiments of the present invention, in step (B), said curing is carried out at a temperature of 180-250° C. for 1-10 min.

According to some embodiments of the present invention, in step (A) the pH of said impregnation solution is adjusted to alkaline before impregnation. In some embodiments, the pH of the impregnating solution is adjusted to alkaline by using an alkaline solution such as a potassium hydroxide solution or an ammonia solution, preferably with a pH of 8.0-11.0.

In the fourth aspect, the present invention also provides an impregnation method for fiber surface treatment, wherein the method comprises the following steps:

i) placing the fiber in a one-bath impregnation solution for impregnation, wherein the one-bath impregnation solution comprises the following components in parts by weight: 0.5-2.5 parts of epoxy resin, 3-10 parts of blocked isocyanate and 90-110 parts of deionized water;
ii) drying and curing the impregnated fibers obtained in step i), followed by curing;
iii) placing the fibers treated in step ii) in a two-bath impregnation solution for impregnation, said two-bath impregnation solution comprises the following components in parts by weight: 5-15 parts of hydroxyacrylic resin, 0.5-3 parts of amino resin, 1-5 parts of accelerator, 80-200 parts of rubber latex and 90-110 parts of deionized water;
iv) drying and curing the fibers treated in step iii).

According to some embodiments of the present invention, in step i) the impregnation is carried out at a temperature of 15-40° C. for 1-5 min.

According to some embodiments of the present invention, in step ii), said drying is carried out at a temperature of 110-160° C. for 1-10 min.

According to some embodiments of the present invention, in step ii), said curing is carried out at a temperature of 180-250° C. for 1-10 min.

According to some embodiments of the present invention, in step iii), said impregnation is carried out at a temperature of 15-40° C. for 1-5 min.

According to some embodiments of the present invention, in step iv), said drying is carried out at a temperature of 110-160° C. for 1-10 min.

According to some embodiments of the present invention, in step iv), said curing is carried out at a temperature of 180-260° C. for 1-10 min.

According to some embodiments of the present invention, in step iii) the pH of said two-bath impregnation solution is adjusted to alkaline prior to impregnation, in some embodiments the pH of the impregnating solution is adjusted to alkaline by using an alkaline solution, such as sodium hydroxide solution or ammonia solution, preferably with a pH of 8.0-11.0.

The treatment method according to the present invention, wherein the deionized water, the hydroxyacrylic resin, the amino resin, the epoxy resin, the blocked isocyanate, the accelerator, and the rubber latex are the same as those described previously and will not be repeated herein.

According to some embodiments of the present invention, said fibers comprise cotton fibers, rayon fibers, polyamide fibers, polyester fibers, aramid fibers, ultra-high molecular weight polyethylene fibers, polyimide fibers, carbon fibers, or a blended twisted cord of the above fibers.

According to some embodiments of the present invention, the form of said fibers is selected from monofilaments, tows, twisted cord, canvas, cord fabric or combinations thereof.

The present invention proposes a novel environmentally friendly impregnation system for surface treatment of fibers. Depending on the type of fiber and the application, a one-step impregnation treatment or a two-step impregnation treatment can be selected.

The impregnation system of the present invention provides excellent adhesion between the fibers treated with the impregnation system and the rubber matrix, which can be used as a substitute for RFL. At the same time, the fibers treated with this environmentally friendly impregnation system do not lose much strength and do not affect their use.

When the present invention is treated by one-step impregnation, the surface of the fiber is coated with hydroxyacrylate resin-amino resin-rubber latex. On the one hand, the hydroxyacrylate resin and the amino resin can react to form a resin network structure, and the polar groups can react with the fiber; on the other hand, the rubber latex particles in the network structure can take part in the co-sulphurization of the rubber matrix, so as to provide a better adhesion between the fiber backbone material and the rubber. When treated by two-step impregnation, the fiber surface can be activated firstly by epoxy resin and isocyanate in one-bath impregnation solution and then coated with hydroxyacrylate resin-amino resin-rubber latex by the two-bath impregnation solution, so as to form the above-mentioned physical and chemical interactions between the fiber and the rubber matrix, and to improve the adhesion performance.

Advantages and features of the present invention:
1. The impregnation system of the present invention successfully eliminates the use of both resorcinol and formaldehyde, substantially reducing the harm to the environment and the human body, and the preparation of the impregnation system and impregnation treatment method for fiber surface treatment is simple and the reaction time is short, which is conducive to industrial production.
2. The raw materials used in this invention are all industrialized products with a wide source and low price, and are all water-soluble.
3. The viscosity of the impregnating system remains stable even when the impregnating system is stored at room temperature for extended periods, making it suitable for long-term storage and transportation without compromising its ability to effectively permeate the fiber skeleton material during the impregnation process.

SPECIFIC EMBODIMENTS

The raw materials used in the following examples and comparative examples are all commercially available, including:
Hydroxyacrylic resin: purchased from Guangzhou Dolphin New Material Co. Ltd, with a number average molecular weight of about 10,000 and a hydroxyl content of 3.2 wt %.
amino resin: purchased from Zhanxin Resin (China) Co., Ltd. with an average molecular weight of about 600 and a solid content of 80 wt %.
Sorbitol glycidyl ether: CAS 68412-01-1, purchased from Nan Ya Epoxy Resin Co., Ltd
Diphenylmethane diisocyanate capped with ε-caprolactam: CAS 5101-68-8, CBI 50, purchased from Changzhou Keying Chemical Co., Ltd.
Styrene-butadiene-vinyl pyridine latex (VP latex): brand VP-15, purchased from Jiangsu Yatai Chemical Co., Ltd
Resorcinol: CAS 108-46-3, purchased from Shanghai Aladdin Biochemical Science and Technology Co, Ltd, purity ≥99 wt %.
Formaldehyde: CAS 50-00-0, purchased from Shanghai Aladdin Biochemical Science and Technology Co, Ltd, purity 37 wt %.

The H pull-out force test samples in the following examples and comparative examples are prepared as follows:
Referring to the standard GB/T2942-2009, the standard rubber (the standard rubber formula refers to GB/T9101-2017) is completely wrapped around the impregnated rubber cord, and then it is placed on a plate vulcanising machine for vulcanisation. The vulcanization process is conducted at a temperature of 136° C. for a duration of 50 minutes, under a pressure of 15 MPa.

The peel force test samples in the following examples and comparative examples are prepared as follows:
Referring to the standard for determining the adhesion force of nylon 66 impregnated single cord by the peeling method of Shenma Industrial Co. The formulation of the rubber compound used for vulcanisation is the same as that of the H pull-out force test. The vulcanisation temperature is 160° C., the vulcanisation time is 20 min, and the vulcanisation pressure is 2.354 MPa.

The cord tensile strength specimens in the following examples and comparative examples are prepared as follows:
Adopting the standard GB/T32108-2015, the cord after impregnation is tested for cord strength by tensile machine. The length of the cord in the test area is 250 mm, and the tensile speed is 300 mm/min.

In the following examples and comparative examples, the cord tensile strength test is tested in accordance with GB/T32108-2015; the H pull-out force is tested in accordance with GB/T2942-2009; and the peel force test is conducted as follows:
Vulcanisation mould dimensions: film cavity depth 2 mm, length 250 mm, width 170 mm, each specimen width 20 mm, piece to piece spacing 6 mm, the mould is retained on both sides of 10 mm, the thickness of the cover plate and the bottom plate of the mould are not less than 10 mm.

The formulation of rubber compound used for vulcanisation is the same as that of H pull-out force test.

Vulcanisation process: 160° C.×20 min, pressure 2.354 Mpa.

Vulcanisation process: 1) Preheat the mould at 136° C. for 15~20 min, then load a single cord into the groove, so that the cord is vertically tensioned; 2) Place a 20 mm long, 160 mm wide, 0.5 mm thick film at the lower end of the mould close to the border and attach a cellophane slightly larger than the film on it; 3) A film with 240 mm long, 160 mm wide, 1.7 mm thick is placed on the cellophane and a lining of the same size is attached to it. Press and cover the mould and then vulcanize the cord. After vulcanisation and cooling for at least 2 h, the specimens are trimmed to test the peeling force (each specimen contains 5 cords).

Test procedure: The part separated with cellophane is clamped into the upper and lower grippers of the tensile machine at an angle of 180° for tensile peeling. The speed of the tensile machine was set to 300 mm/min, and the peeling length was (150±10) mm. The average adhesion force (N) was read according to the peeling curve, and the peel force of a single cord was calculated.

Example 1

An environmentally friendly one-step impregnation system for fiber surface treatment comprising the following components in parts by weight

| | |
|---|---|
| One-step impregnation solution | 100 parts of deionized water<br>10 parts of hydroxyacrylic resin<br>2 parts of amino resin (1 part of fully methylated melamine resin, 0.5 parts of polymeric partially methylated melamine resin, 0.5 parts of high-imino methylated melamine resin)<br>8 parts of blocked isocyanate (3 parts of diphenylmethane diisocyanate blocked with ε-caprolactam, 5 parts of isophorone diisocyanate blocked with phenol)<br>1.5 parts of accelerator (0.5 parts of amine-contained dinonyl naphthalene disulfonic acid, 1 part of amine-contained p-toluenesulfonic acid)<br>100 parts of rubber latex (50 parts of butyl pyridine latex, 50 parts of butyl phenyl pyridine latex) |

Preparation method of impregnation solution: add hydroxyacrylic resin, amino resin and accelerator in the formula to deionized water in turn, and stir the solution powerfully with an electric stirrer for 3 h; subsequently add blocked isocyanate, and stir for 1 h, and finally add rubber latex to the solution and keep stirring powerfully for 2 h, thereby obtaining a one-step rubber impregnation solution.

Impregnation treatment method: the fiber cord is impregnated in the impregnating solution for 1 min at room temperature, then dried and cured in an oven. The drying temperature is 150° C. and the drying time is 2 min, the curing temperature is 220° C. and the curing time is 2 min.

Example 2

An environmentally friendly impregnation treatment system for fiber surface treatment comprising the following components in parts by weight:

| | |
|---|---|
| One-step impregnation solution | 100 parts of deionized water<br>8 parts of hydroxyacrylic resin<br>1 part of amino resin (0.5 parts of polymeric partially methylated melamine resin, 0.5 parts of high-imino methylated melamine resin)<br>3 parts of blocked isocyanate (3 parts of phenol blocked isophorone diisocyanate)<br>1 part of accelerator (0.5 parts of amine-contained dinonylnaphthalenesulphonic acid, 0.5 parts of amine-contained p-toluenesulphonic acid)<br>150 parts of rubber latex (80 parts of butyl pyrene latex, 20 parts of butyl phenyl latex, 50 parts of butyl phenyl pyrene latex) |

Preparation method of impregnation solution: add hydroxyacrylic resin, amino resin and accelerator in the formula to deionized water in turn, and stir the solution powerfully with an electric stirrer for 2 h; subsequently, add blocked isocyanate and stir for 30 min, and finally add the rubber latex to the solution and keep stirring powerfully for 1 h, thereby obtaining one-step rubber impregnation solution.

Impregnation treatment method: the fiber cord is impregnated in the impregnating solution for 1.5 min at room temperature, then dried and cured in an oven. The drying temperature is 150° C. and the drying time is 3 min, the curing temperature is 210° C. and the curing time is 3 min.

Example 3

An environmentally friendly impregnation treatment system for fiber surface treatment comprising the following components in parts by weight:

| | |
|---|---|
| One-step impregnation solution | 100 parts of deionized water<br>12 parts of hydroxyacrylic resin<br>2 parts of amino resin (1 part of fully methylated melamine resin, 1 part of high-imino methylated melamine resin)<br>5 parts of blocked isocyanate (2 parts of toluene diisocyanate blocked by phenol, 3 parts of diphenylmethane diisocyanate blocked by ε-caprolactam)<br>1 part of accelerator (0.5 parts of amine-capped dodecylbenzenesulfonic acid, 0.5 parts of amine-capped p-toluenesulfonic acid)<br>120 parts of rubber latex (80 parts of butylated latex, 40 parts of natural latex) |

Preparation method of impregnation solution: add hydroxyacrylic resin, amino resin and accelerator in the formula to deionized water in turn, and stir the solution powerfully with an electric stirrer for 1.5 h; subsequently add blocked isocyanate and stir for 30 min, and finally add the rubber latex to the solution and keep stirring powerfully for 1.5 h, thereby obtaining one-step rubber impregnation solution.

Impregnation treatment method: The fiber cord is impregnated in the impregnating solution for 1 min at room temperature, then dried and cured in an oven. The drying temperature is 150° C. and the drying time is 1.5 min, the curing temperature is 225° C. and the curing time is 1.5 min.

Example 4

An environmentally friendly impregnation treatment system for fiber surface treatment comprising the following components in parts by weight:

| | |
|---|---|
| One-step impregnation solution | 100 parts of deionized water<br>6 parts of hydroxyacrylic resin<br>3 parts of epoxy resin (1.5 parts of sorbitol glycidyl ether, 1.5 parts of propylene glycidyl ether)<br>4 parts of amino resin (1 part of polymeric partially methylated melamine resin, 3 parts of high-imino methylated melamine resin)<br>10 parts of blocked isocyanate (3 parts of phenol blocked toluene diisocyanate, 7 parts of phenol blocked isophorone diisocyanate)<br>1.5 parts of accelerator (1 part of amine-contained dodecylbenzenesulfonic acid, 0.5 parts of amine-contained p-toluenesulfonic acid)<br>100 parts of rubber latex (50 parts of butyl pyridine latex, 50 parts of nitrile latex) |

Preparation method of impregnation solution: add the epoxy resin described in the formula to deionized water and stir for 1 h to get a uniform dispersion; then add hydroxyacrylic resin, amino resin and blocked isocyanate in turn and stir for 2 h; after that, add accelerator and stir for 1 h, and finally add rubber latex and continue to stir for 2 h, thereby obtain one-step impregnation solution.

Impregnation treatment method: the fiber cord is impregnated in the impregnating solution for 1 min at room temperature, then dried and cured in an oven. The drying temperature is 160° C. and the drying time is 2 min, the curing temperature is 210° C. and the curing temperature is 2 min.

Example 5

An environmentally friendly impregnation treatment system for fiber surface treatment comprising the following components in parts by weight:

| | |
|---|---|
| One-step impregnation solution | 100 parts of deionized water<br>10 parts of hydroxyacrylic resin<br>6 parts of epoxy resin (3 parts of 1,4-butanediol diglycidyl ether, 3 parts of glycerol glycidyl ether of propanetriol)<br>2 parts of amino resin (0.5 parts of polymeric partially methylated melamine resin, 1.5 parts of high-imino methylated melamine resin)<br>7 parts of blocked isocyanate (3 parts of diphenylmethane diisocyanate blocked with ε-caprolactam, 4 parts of trimethyl-1,6-hexamethylene diisocyanate blocked with butanone oxime)<br>1 part accelerator (1 part amine-capped dodecylbenzenesulphonic acid)<br>150 parts of rubber latex (50 parts of butyl pyridine latex, 50 parts of nitrile latex, 50 parts of butyl phenyl pyridine latex) |

Preparation method of impregnation solution: add the epoxy resin described in the formula to deionized water and stir for 1.5 h to get a uniform dispersion; then add hydroxyacrylic resin, amino resin and blocked isocyanate in turn and stir for 1.5 h; after that, add accelerator and stir for 1.5 h, and finally, add rubber latex and continue to stir for 2 h, thereby obtain one-step impregnation solution.

Impregnation treatment method: the fiber cord is impregnated in the impregnating solution for 1.5 min at room temperature, then dried and cured in an oven. The drying temperature is 150° C. and the drying time is 2 min, the curing temperature is 225° C. and the curing time is 2 min.

Example 6

An environmentally friendly impregnation treatment system for fiber surface treatment comprising the following components in parts by weight:

| One-step impregnation solution | 100 parts of deionized water<br>7 parts of hydroxyacrylic resin<br>4 parts of epoxy resin (2 parts of bisphenol A type epoxy resin, 2 parts of glycerol glycidyl ether of propanetriol)<br>1.5 parts of amino resin (1 part of fully methylated melamine resin, 0.5 parts of high-imino methylated melamine resin)<br>6 parts of blocked isocyanate (6 parts of diphenylmethane diisocyanate blocked by ε-caprolactam)<br>4 parts of accelerator (2 parts of amine-contained dinonylnaphthalenesulphonic acid, 2 parts of amine-contained p-toluenesulphonic acid)<br>150 parts of rubber latex (50 parts of styrene-butadiene latex, 100 parts of styrene-butadiene latex) |
|---|---|

Preparation method of impregnation solution: add the epoxy resin described in the formula to deionized water and stir for 1.5 h to get a uniform dispersion; then add hydroxyacrylic resin, amino resin and blocked isocyanate in turn and stir for 2 h; after that, add accelerator and stir for 1.5 h, and finally, add rubber latex and continue to stir for 2 h, thereby obtain one-step impregnation solution.

Impregnation treatment method: the fiber cord is impregnated in the impregnating solution for 2 min at room temperature, then dried and cured in an oven. The drying temperature is 160° C. and the drying time is 1.5 min, the curing temperature is 220° C. and the curing time is 1.5 min.

Comparative Example 1

Comparative example 1 is a conventional RFL impregnation treatment with the RFL formulation as shown in the table below:

| RFL impregnation solution | 100 parts of deionized water<br>3.7 parts of resorcinol<br>5.4 parts of formaldehyde (37 wt %)<br>0.1 parts of sodium hydroxide (100 wt %)<br>80.0 parts of VP latex (40 wt %)<br>1.0 part of ammonia |
|---|---|

Preparation method of RFL solution: firstly, sodium hydroxide was added into deionized water according to the above formula and stirred for 10 min, then resorcinol was added and stirred for 10 min, then formaldehyde aqueous solution was added and stirred for 6 h at room temperature to obtain a homogeneous reaction solution; finally, butylpyrazine latex was added and stirred for 2 h at room temperature with ammonia being added during this period, finally obtaining the RFL impregnation solution.

RFL impregnation treatment method: the fiber cord is impregnated in the impregnating solution for 1 min at room temperature, then dried and cured in an oven. The drying temperature is 150° C. and the drying time is 3 min, the curing temperature is 220° C. and the curing time is 3 min.

Application Examples 1 to 6 and comparative Application Example 1 treated different fiber cords using the one-step impregnation method, the cord used in Application Examples 1-1, 2-1, 3-1, 4-1, 5-1, 6-1 and comparative Application Example 1-1 was a nylon 6 cord (1170 dtex/2); the cord used in Application Examples 1-2, 2-2, 3-2, 4-2, 5-2, 6-2 and comparative Application Example 1-2 was a nylon 66 cord (1400 dtex/2).

Different fiber cords treated with the impregnation processes according to Application Examples 1-6 and Comparative Application Example 1 were prepared into test specimens using the aforementioned method. These specimens are subjected to H extraction test, peel test, and cord strength test, and the results of these tests are presented in Table 1.

TABLE 1

Data on fiber cord treatment by one-step impregnation treatment method

|  |  |  | H pull-out force (N) | Peel force (N) |  |
|---|---|---|---|---|---|
| Application Example 1-1 | Example 1 | Nylon 6 cord (1170dtex/2) | 158.6 ± 13.4 | 17.1 ± 1.3 | 174.8 ± 2.9 |
| Application Examples 1-2 | Example 1 | Nylon 66 cord (1400dtex/2) | 180.9 ± 12.8 | 19.7 ± 2.3 | 210.5 ± 2.6 |
| Application Example 2-1 | Example 2 | Nylon 6 cord (1170dtex/2) | 160.4 ± 10.8 | 17.2 ± 2.8 | 173.4 ± 2.3 |
| Application Example 2-2 | Example 2 | Nylon 66 cord (1400dtex/2) | 183.4 ± 11.5 | 21.2 ± 2.4 | 207.3 ± 3.7 |
| Application Example 3-1 | Example 3 | Nylon 6 cord (1170dtex/2) | 159.7 ± 12.7 | 17.0 ± 1.6 | 174.6 ± 2.6 |
| Application Example 3-2 | Example 3 | Nylon 66 cord (1400dtex/2) | 182.4 ± 12.1 | 20.8 ± 1.9 | 208.7 ± 3.2 |
| Application Example 4-1 | Example 4 | Nylon 6 cord (1170dtex/2) | 164.4 ± 13.2 | 17.5 ± 3.1 | 173.7 ± 2.4 |
| Application Example 4-2 | Example 4 | Nylon 66 cord (1400dtex/2) | 186.6 ± 12.8 | 20.4 ± 1.7 | 209.3 ± 1.6 |
| Application Example 5-1 | Example 5 | Nylon 6 cord (1170dtex/2) | 162.3 ± 13.2 | 17.4 ± 2.7 | 172.9 ± 2.1 |
| Application Example 5-2 | Example 5 | Nylon 66 cord (1400dtex/2) | 188.3 ± 12.6 | 21.8 ± 3.1 | 208.3 ± 2.7 |
| Application Example 6-1 | Example 6 | Nylon 6 cord (1170dtex/2) | 162.7 ± 11.3 | 17.6 ± 3.1 | 173.7 ± 2.0 |

TABLE 1-continued

Data on fiber cord treatment by one-step impregnation treatment method

| | | | H pull-out force (N) | Peel force (N) | |
|---|---|---|---|---|---|
| Application Example 6-2 | Example 6 | Nylon 66 cord (1400dtex/2) | 186.7 ± 11.5 | 21.7 ± 2.4 | 207.3 ± 3.7 |
| Comparative Application Example1-1 | Comparative Example 1 | Nylon 6 cord (1170dtex/2) | 154.7 ± 12.1 | 17.2 ± 1.8 | 175.1 ± 3.8 |
| Comparative Application Example1-2 | Comparative Example 1 | Nylon 66 cord (1400dtex/2) | 182.5 ± 7.3 | 21.5 ± 1.5 | 211.5 ± 2.7 |

According to the results in Table 1, the H-pull-out performance and peel force of the two fiber cords of Application Examples 1 to 3 are basically comparable to those of the fiber cords of comparative Application Examples treated with RFL. And by adding epoxy resin, the adhesion effect of the two kinds of fiber cord treated with Application Examples 4 to 6 is further improved compared with that of the fiber cords of comparative Application Examples treated with RFL. And from the test results of the cord strength, it is evident that the strength loss of fibers treated by this method is minimal, thus having no significant impact on their usability. In summary, fibers subjected to the environmentally friendly one-step impregnation system exhibit excellent adhesion properties with the rubber matrix, effectively serving as a viable alternative to the conventional RFL impregnation system.

Example 7

An environmentally friendly impregnation treatment system for fiber surfaces, comprising the following components in parts by weight:

| | |
|---|---|
| One-bath impregnation solution | 100 parts of deionized water<br>2 parts of epoxy resin (2 parts of sorbitol glycidyl ether)<br>8 parts of blocked isocyanate (4 parts of diphenylmethane diisocyanate blocked with ε-caprolactam, 4 parts of trimethyl-1,6-hexamethylene diisocyanate blocked with butanone oxime) |
| Two-bath impregnation solution | 100 parts of deionized water<br>8 parts of hydroxyacrylic resin<br>1 part of amino resin (0.5 parts of fully methylated melamine resin, 0.5 parts of high-imino methylated melamine resin)<br>2 parts of accelerator (2 parts of amine-capped dodecylbenzenesulphonic acid)<br>100 parts of rubber latex (50 parts of butyl pyridine latex, 50 parts of styrene butadiene latex) |

Preparation method of impregnation solution: 1) add the water-soluble epoxy resin described in the formula to the deionized water and stir for 15 min, and then add blocked isocyanate and stir for 1 h, to get a uniform reaction solution, and thereby obtain one-bath impregnating solution; 2) add the hydroxyacrylic resin described in the formula to the deionized water and stir for 1.5 h, to get a uniform dispersion; and then add the amino resin and accelerator and stir for 30 min Then add the amino resin and accelerator and stir for 30 min, and finally add the rubber latex and continue to stir for 1.5 h, and thereby obtain the two-bath impregnating solution.

Impregnation treatment: The fiber cord is firstly placed in one-bath impregnation solution, after impregnation for 2 min at room temperature, drying at 130° C. for 1 min, and curing at 210° C. for 2 min; then the fiber is placed in two-bath impregnation solution, after impregnation for 2 min at room temperature, drying at 130° C. for 2 min, and lastly, curing at 210° C. for 2 min, so as to make the impregnation solution adhered on the surface of the fiber.

Example 8

An environmentally friendly impregnation treatment system for fiber surface treatment comprising the following components in parts by weight:

| | |
|---|---|
| One-bath impregnating solution | 100 parts of deionized water<br>1.5 parts of epoxy resin (1.5 parts of sorbitol glycidyl ether)<br>5 parts of blocked isocyanate (2 parts of phenol blocked isophorone diisocyanate, 3 parts of phenol blocked toluene diisocyanate) |
| Two-bath impregnation solution | 100 parts of deionized water<br>7 parts of hydroxyacrylic resin<br>1.5 parts of amino resin (1 part of fully methylated melamine resin, 0.5 parts of polymeric partially methylated melamine resin)<br>3 parts of accelerator (0.5 parts of amine-contained dinonylnaphthalene disulphonic acid, 0.5 parts of amine-contained dodecylbenzenesulphonic acid, 2 parts of amine-contained p-toluenesulphonic acid)<br>120 parts of rubber latex (70 parts of butylated latex, 50 parts of natural latex) |

Preparation of rubber impregnation solution: 1) add the water-soluble epoxy resin described in the formula to the deionized water and stir for 1 h, and then add the blocked isocyanate and stir for 30 min, to get the uniform reaction solution, and thereby obtain one-bath impregnating solution; 2) add the hydroxyacrylic resin described in the formula to the deionized water and stir for 2 h, to get the uniform dispersion; then add the amino resin and accelerator and stir for 1 h, and finally add the rubber latex, continue to stir for 1.5 h, and thereby obtain the two-bath impregnating solution.

Impregnation treatment: The fiber cord is firstly placed in one-bath impregnating solution, after impregnating for 1 min at room temperature, drying for 1.5 min at 130° C. and curing for 2 min at 210° C.; then the fiber is placed in two-bath impregnation solution, after impregnating for 1 min at room temperature, drying for 1.5 min at 160° C., and lastly, curing for 2 min at 210° C., so that impregnating solution is adhered on the surface of the fiber.

Comparative Example 2

Comparative example 2 is a traditional RFL two-step treatment, and the traditional RFL two-step impregnation solution formulation is as follow:

| | |
|---|---|
| One-bath impregnation solution | 100 parts of deionized water<br>1.5 parts of sorbitol glycidyl ether<br>5 parts of diphenylmethane diisocyanate capped by ε-caprolactam |
| RFL impregnation solution | 100 parts of deionized water<br>3.7 parts of resorcinol<br>5.4 parts of formaldehyde (37 wt %)<br>0.1 parts of sodium hydroxide (100 wt %)<br>80 parts of VP latex (40 wt %)<br>1 part ammonia |

Preparation method of impregnation solution: firstly, add the water-soluble epoxy resin described in the formula into the deionized water and stir for 15 min, and then add the blocked isocyanate and stir for 1 h, to make a one-bath impregnating solution; then add sodium hydroxide into the deionized water according to the above formula, and stir for 10 min, and then add resorcinol and stir for 10 min, and finally add the formaldehyde aqueous solution and stir for 6 h at room temperature, to get the homogeneous reaction solution, and finally add butyl pyridine latex and stir at room temperature for 2 h, with ammonia being added during this period to finally obtain RFL impregnation solution.

Impregnation treatment: The fiber cord is firstly placed in one-bath impregnation solution, after impregnation for 1 min at room temperature, drying at 130° C. for 3 min, and curing at 220° C. for 3 min; then the fiber is placed in RFL impregnation solution, after impregnation for 2 min at room temperature, drying at 130° C. for 3 min, and finally curing at 220° C. for 3 min, so that impregnation solution adheres on the surface of the fiber.

Application Examples 7-8 and Comparative Application Example 2 involve the treatment of different fiber cords using a two-bath method. In Application Examples 7-1 and 8-1, and Comparative Application Example 2-1, the treated cords are Nylon 66 cords (1400 dtex/2). In Application Examples 7-2 and 8-2, and Comparative Application Example 2-2, the treated cords are Aramid cords (1670 dtex/2). In Application Examples 7-3 and 8-3, and Comparative Application Example 2-3, the treated cords are Polyester cords (1440 dtex/2). In Application Examples 7-4 and 8-4, and Comparative Application Example 2-4, the treated cords are hybrid cords composed of Aramid/Nylon 66 cabled cords (A1670dtex/2+N2100dtex/1).

Different fiber cords treated with the impregnation processes according to Application Examples 7-8 and Comparative Application Example 2 were prepared into test specimens using the aforementioned methods. These specimens are subjected to H extraction tests, peel tests, and cord strength test, and the results of these tests are presented in Table 2.

TABLE 2

Data of fiber cord treatment by double-bath impregnation treatment method

| groups | Source of impregnation system | fiber type | Adhesive property H pull-out force (N) | Peel force (N) | Cord strength (N) |
|---|---|---|---|---|---|
| Application Example 7-1 | Example 7 | Nylon 66 cord (1400dtex/2) | 200.6 ± 11.5 | 23.1 ± 1.4 | 209.3 ± 1.7 |
| Application Example 7-2 | Example 7 | Aramid (1670dtex/2) | 182.4 ± 13.9 | 19.3 ± 1.9 | 501.4 ± 3.6 |
| Application Example 7-3 | Example 7 | Polyester (1440dtex/2) | 162.6 ± 14.0 | 18.8 ± 2.0 | 187.6 ± 3.0 |
| Application Example 7-4 | Example 7 | Aramid/Nylon 66 (A1670dtex/2 + N2100dtex/1) | 252.7 ± 14.3 | 23.8 ± 2.3 | 582.0 ± 2.4 |
| Application Example 8-1 | Example 8 | Nylon 66 cord (1400dtex/2) | 201.6 ± 12.5 | 23.3 ± 2.0 | 208.9 ± 1.3 |
| Application Example 8-2 | Example 8 | Aramid (1670dtex/2) | 181.2 ± 11.7 | 19.2 ± 2.5 | 501.2 ± 2.3 |
| Application Example 8-3 | Example 8 | Polyester (1440dtex/2) | 163.4 ± 13.1 | 18.5 ± 1.7 | 188.4 ± 3.2 |
| Application Example 8-4 | Example 8 | Aramid/Nylon 66 (A1670dtex/2 + N2100dtex/1) | 253.8 ± 13.8 | 24.0 ± 1.8 | 581.8 ± 2.1 |
| Comparative Application Example 2-1 | Comparative Example 2 | Nylon 66 cord (1400dtex/2) | 191.5 ± 7.3 | 22.5 ± 1.5 | 211.4 ± 2.7 |
| Comparative Application Example 2-2 | Comparative Example 2 | Aramid (1670dtex/2) | 170.4 ± 13.2 | 19.1 ± 1.8 | 503.5 ± 4.2 |
| Comparative Application Example 2-3 | Comparative Example 2 | Polyester (1440dtex/2) | 161.6 ± 12.6 | 18.4 ± 1.3 | 189.9 ± 3.4 |
| Comparative Application Example 2-4 | Comparative Example 2 | Aramid/Nylon 66 (A1670dtex/2 + N2100dtex/1) | 249.6 ± 14.6 | 23.4 ± 1.5 | 582.1 ± 2.6 |

According to the results in Table 2, the H-pull-out and peel forces of the different fiber cords of Application Examples 7 to 8 exceeded those of different fiber cords treated with RFL in Comparative application Example. In particular, when Application Examples 7-1 and 7-2 were treated with nylon 66 cord (1400 dtex/2) using the two-bath method, the adhesion effect after the impregnation treatment was superior to that of the one-bath method. Moreover, from the test results of the strength of the cord, the loss of strength of the fibers after treatment by the two-bath method is not significant and will not affect its use. In summary, the new environmentally friendly impregnation system has excellent adhesion between the fibers and the rubber matrix after the two-bath treatment, and can effectively replace the RFL impregnation system.

The above-mentioned embodiments are only the preferred embodiments of the present invention, and are not other forms of limitation on the present invention. Any modifications, equivalent changes and improvements made to the above embodiments without departing from the technical essence of the claims of the present invention shall still fall within the scope of protection of the claims of the present invention.

What is claimed is:

1. An environmentally friendly impregnation system for fiber surface treatment comprising the following components in parts by weight:

| | |
|---|---|
| deionized water | 100 parts; |
| hydroxy acrylic resin | 1-30 parts; |
| amino resin | 0.1-10 parts; |
| blocked isocyanates | 1-10 parts; |
| accelerator | 0.1-5 parts; |
| rubber latex | 50-180 parts. |

2. The environmentally friendly impregnation system according to claim 1, wherein the parts by weight of each component are as follows:

| | |
|---|---|
| deionized water | 100 parts; |
| hydroxy acrylic resin | 1-15 parts; |
| amino resin | 0.1-8 parts; |
| epoxy resin | 1-10 parts; |
| blocked isocyanates | 1-10 parts; |
| accelerator | 0.1-4 parts. |
| rubber latex | 50-150 parts. |

3. The environmentally friendly impregnation system according to claim 1, wherein the hydroxy acrylic resin has a hydroxyl content of 2.0-5.0 wt % and a number average molecular weight of 8000-15000.

4. The environmentally friendly impregnation system according to claim 1, wherein the amino resin is at least one selected from the group consisting of urea-formaldehyde resin, melamine-formaldehyde resin, polyamide-polyamine epichlorohydrin resin, etherified urea-formaldehyde resin, etherified glycoluril resin, fully methylated melamine resin, polymerized partially methylated melamine resin and polymerized high iminomethylated melamine resin.

5. The environmentally friendly impregnation system according to claim 1, wherein the epoxy resin is at least one selected from the group consisting of bisphenol A typed epoxy resin, epoxidized novolac resin, ethylene glycol diglycidyl ether, polyethylene glycol diglycidyl ether, 1,2-propylene glycol diglycidyl ether, polypropylene glycol diglycidyl ether, 1,4-butanediol diglycidyl ether, diglycidyl ether, glycerol glycidyl ether, trimethylolpropane glycidyl ether, tetraphenyl ethane tetra glycidyl ether epoxy resin, resorcinol bisglycidyl ether type epoxy resin and bisresorcinol formal tetraglycidyl ether.

6. The environmentally friendly impregnation system according to claim 1, wherein the blocked isocyanate consists of isocyanate and blocking agent, the isocyanate is at least one selected from the group consisting of trimethyl-1,6-hexamethylene diisocyanate, tetramethylene diisocyanate, tetramethyl diisocyanate, 2,4-tolylene diisocyanate, 2,6-tolylene diisocyanate, 1,3-phenylene diisocyanate, 1,4-phenylene diisocyanate, isophorone diisocyanate and diphenylmethane diisocyanate; the blocking agent is at least one selected from the group consisting of epsilon-caprolactam, butanone oxime and phenol.

7. The environmentally friendly impregnation system according to claim 1, wherein the accelerator is at least one selected from the group consisting of amine-capped dinonylnaphthalene disulfonic acid, amine-capped dinonylnaphthalene sulfonic acid, amine-capped dodecylbenzene sulfonic acid, er and amine-capped p-methylbenzene sulfonic acid.

8. The environmentally friendly impregnation system according to claim 1, wherein the solid content of the rubber latex is 20-60 wt %, and the rubber latex is at least one selected from the group consisting of butadiene-styrene-butadiene-pyridine latex, styrene-butadiene latex, styrene-butadiene-pyridine latex, neoprene latex, butyronitrile latex and natural latex.

9. A preparation method for preparing an environmentally friendly impregnation system for fiber surface treatment according to claim 1 comprising:
(1) one-step impregnation solution system: adding hydroxyl acrylic resin, amino resin, optional epoxy resin and accelerator into deionized water in sequence and stirring, then adding blocked isocyanate and stirring, and finally adding rubber latex and stirring continuously to obtain one-step impregnation solution;
wherein the amount of each component in parts by weight is: 100 parts of deionized water; 1-30 parts of hydroxyl acrylic resin; 0.1-10 parts of amino resin; 1-10 parts of blocked isocyanate; 0.1-5 parts of accelerator and 50-180 parts of rubber latex; or
(2) two-step impregnation solution system: 1) adding water-soluble epoxy resin into deionized water and stirring, then adding blocked isocyanate and stirring to obtain uniform reaction solution, thereby obtaining one-bath impregnation solution; 2) adding hydroxyl acrylic resin, amino resin and accelerator into deionized water in sequence and stirring to obtain uniform dispersion solution, and finally adding rubber latex and continuing stirring to obtain two-bath impregnation solution;
wherein the amount of each component in parts by weight of the one-bath impregnation solution is: 1-2 parts of epoxy resin, 5-8 parts of blocked isocyanate and 95-105 parts of deionized water;
the amount of each component in parts by weight of the two-bath impregnation solution is: 7-10 parts of hydroxy acrylic resin, 1-2.5 parts of amino resin, 1.5-3 parts of accelerator, 100-180 parts of rubber latex and 95-105 parts of deionized water.

10. A method for impregnating fiber surface comprising the following steps:
(A) impregnating the fiber in a one-step impregnation solution;
(B) drying and curing the impregnated fibers obtained in step (A),
wherein the one-step impregnation solution comprises the following components in parts by weight: 100 parts of deionized water; 1-30 parts of hydroxyl acrylic resin; 0.1-10 parts of amino resin; 1-10 parts of blocked isocyanate; 0.1-5 parts of accelerator and 50-180 parts of rubber latex; or a method for impregnating fiber surface comprising the following steps:

i) placing the fiber in a one-bath impregnation solution for impregnation, wherein the one-bath impregnation solution comprises the following components in parts by weight: 0.5-2.5 parts of epoxy resin, 3-10 parts of blocked isocyanate and 90-110 parts of deionized water;

ii) drying and curing the impregnated fibers obtained in step i); followed by curing, iii) placing the fiber treated in step ii) in a two-bath impregnation solution for impregnation, wherein the two-bath impregnation solution comprises the following components in parts by weight: 5-15 parts of hydroxyl acrylic resin, 0.5-3 parts of amino resin, 1-5 parts of accelerator, 80-200 parts of rubber latex and 90-110 parts of deionized water; and iv) drying and curing the treated fibers of step iii).

* * * * *